United States Patent [19]

Kim

[11] Patent Number: 5,650,782
[45] Date of Patent: Jul. 22, 1997

[54] VARIABLE LENGTH CODER USING TWO VLC TABLES

[75] Inventor: Sang-Ho Kim, Seoul, Rep. of Korea

[73] Assignee: Daewoo Electronics Co Ltd., Seoul, Rep. of Korea

[21] Appl. No.: 367,528

[22] Filed: Dec. 30, 1994

[30] Foreign Application Priority Data

Jan. 18, 1994 [KR] Rep. of Korea .................. 94-748

[51] Int. Cl.⁶ .................................................. H03M 7/40
[52] U.S. Cl. .................................................. 341/67; 348/411
[58] Field of Search ...................... 341/67, 106; 348/411, 348/412, 413

[56] References Cited

U.S. PATENT DOCUMENTS

| | | | |
|---|---|---|---|
| 4,509,038 | 4/1985 | Hirano | 341/67 |
| 5,063,443 | 11/1991 | Okajima et al. | 348/411 |
| 5,122,876 | 6/1992 | Aoki | 348/411 |
| 5,138,315 | 8/1992 | Le Queau et al. | 341/67 |
| 5,321,398 | 6/1994 | Ikeda | 341/67 |
| 5,392,037 | 2/1995 | Kato | 341/67 |
| 5,400,075 | 3/1995 | Savatier | 348/384 |
| 5,497,153 | 3/1996 | Jeong | 341/67 |

*Primary Examiner*—Marc S. Hoff
*Attorney, Agent, or Firm*—Anderson Kill & Olick P.C.

[57] ABSTRACT

A variable length coder for converting a source digital code, which is provided from an image signal encoding apparatus using an inter mode or an intra mode compression, to a variable length code by using a first VLC table and a second VLC table, while gauging the amount of output data from the encoding apparatus with a quantization parameter ranging from 1 to 31, comprising: a first VLC unit for encoding the digital source code into the variable length code using the first table; a second VLC unit for encoding the digital source code into the variable length code using the second table; and a switch for selectively providing the source digital code to said first or said second VLC unit, depending on the inter or the intra mode compression and the magnitude of the quantization parameter.

2 Claims, 2 Drawing Sheets

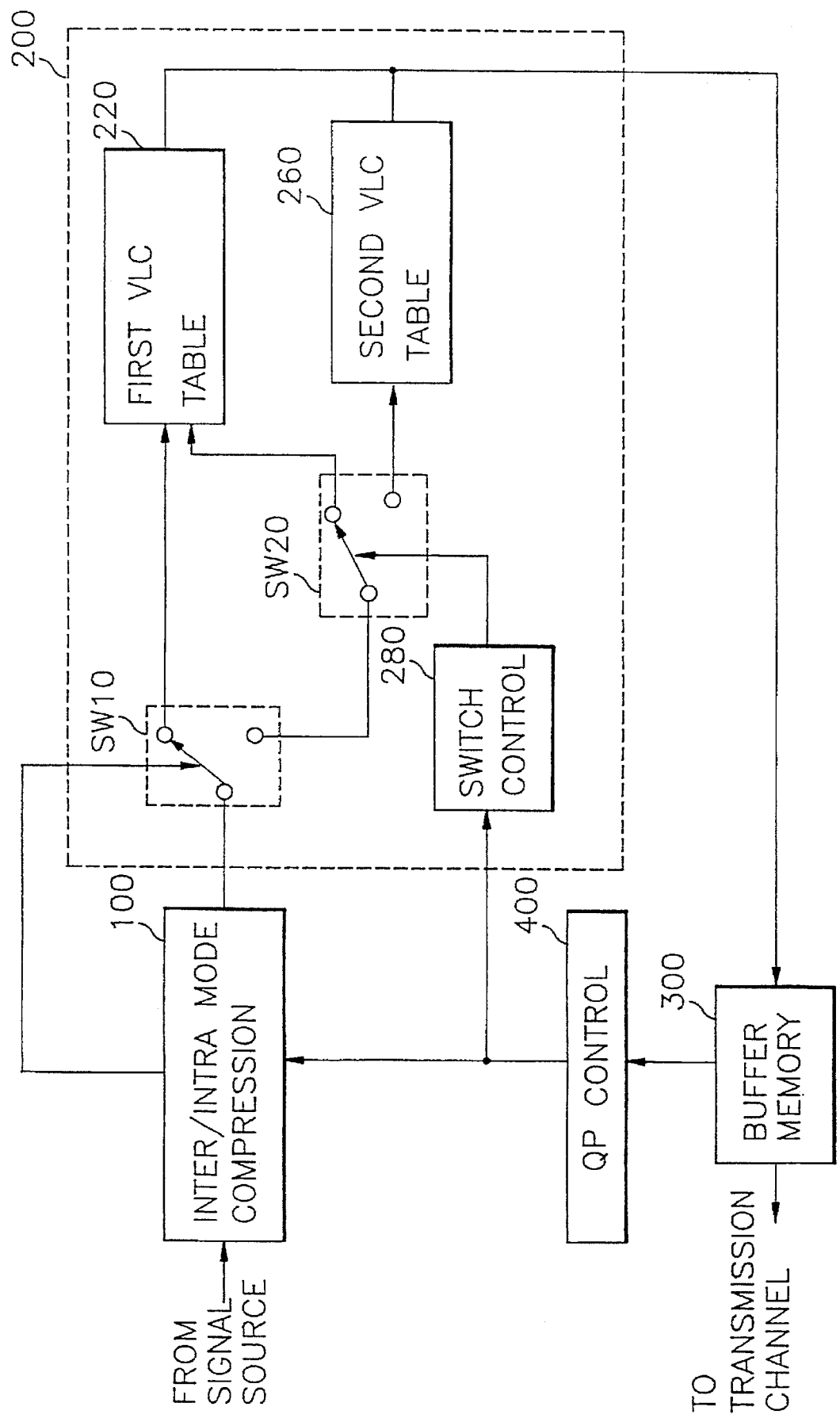

VARIABLE LENGTH CODER USING TWO VLC TABLES

FIELD OF THE INVENTION

The present invention relates to a variable length coder of an image signal encoding apparatus; and, more particularly, to a variable length coder employing two different variable length coding(VLC) tables.

DESCRIPTION OF THE PRIOR ART

Transmission of digitized video signals can deliver video images of a much higher quality than the transmission of analog signals. When an image signal comprising a sequence of image "frames" is expressed in a digital form, a substantial amount of data is generated for transmission, especially in the case of a high definition television system. Since, however, the available frequency bandwidth of a conventional transmission channel is limited, in order to transmit the substantial amounts of digital data through the limited channel bandwidth, it is inevitable to compress or reduce the volume of the transmission data. Among various video compression techniques, the so-called hybrid coding technique, which combines temporal and spatial compression techniques together with a statistical coding technique, is known to be most effective.

Most hybrid coding techniques employ a motion compensated DPCM(differential pulse code modulation), two-dimensional DCT(discrete cosine transform), and quantization of DCT coefficients.

The motion compensated DPCM is a process of determining the movement of an object between a current frame and its previous frame; predicting the current frame based on the motion flow of the object; and computing the difference between the current frame and its prediction to produce a differential signal. This method is described, for example, in Staffan Ericsson, "Fixed and Adaptive Predictors for Hybrid Predictive/Transform Coding", *IEEE Transactions on Communications*, COM-33, No. 12(December 1985); and in Ninomiya and Ohtsuka, "A Motion-Compensated Interframe Coding Scheme for Television Pictures", *IEEE Transactions on Communications*, COM-30, No. 1(January 1982).

The two-dimensional DCT, which reduces or removes spatial redundancies between image data such as motion compensated DPCM data, converts a block of digital image data, for example, a block of 8×8 pixels, into a set of transform coefficient data. This technique is described in Chen and Pratt, "Scene Adaptive Coder", *IEEE Transactions on Communications*, COM-32, No. 3(March 1984). By processing such transform coefficient data with a quantizer, zigzag scanning, a run-length coding and a variable length coding, the amount of data to be transmitted can be effectively compressed.

In the above hybrid coding techniques, an intra mode compression is defined as a compression technique which carries out data compression by two dimensional DCT, quantization and the like, without employing the motion compensated DPCM. On the other hand, an inter(or non-intra) mode compression is a technique that utilizes the above DPCM as well.

Specifically, in the variable length coding(VLC) technique, which employs a VLC table, one variable length code word from the VLC table may be assigned to one source digital code, e.g., a fixed length run-level code word resulting from the run-length coding. In the VLC technique, since a shorter variable length code word is assigned to a source digital code which statistically occurs more frequently, the average word length of the variable length code word becomes shorter than that of the source digital code, thereby rendering it possible to achieve data compression.

In the MPEG(Moving Picture Experts Group) standard, since the statistical distribution of source digital codes compressed from the inter mode compression is different from that of the intra mode compression, two different VLC tables are employed. According to the MPEG standard, in case of inter mode compression, the first VLC table is used, and in case of intra mode compression, either the first or the second VLC table is utilized. Since, however, in the MPEG, the criterion of table selection is not defined in case of an intra mode compression, various methods have been contemplated for the VLC table selection.

FIG. 1 shows one of the conventional image signal encoding apparatus which comprises a variable length coder employing two different VLC tables. As shown is in FIG. 1, the input digital signal is provided from a signal source(not shown), for example, a video camera. The input signal is applied to an inter/intra mode compression block 10. In the inter/intra compression block 10, the input digital signal is adaptively compressed by using an inter or an intra mode compression technique on a block-by-block process. The block size of the input digital signal typically ranges between 8×8 and 32×32 pixels.

The compressed data of each block and an inter/intra mode selection signal indicating whether said each block is compressed through an inter or an intra mode are provided to a variable length coder 20 wherein the compressed data, e.g., run level codes, are converted into variable length code words. Thereafter, the variable length code words from the variable length coder 20 are sent to a buffer memory 30 to transmit them to a receiver(not shown) via a transmission channel(not shown).

Generally, since the output from the variable length coder 20 is produced at an irregular bit rate, a buffer memory 30 is required to transmit them at a constant bit rate through the transmission channel. Since the output data from the variable length coder 20 is written at an irregular bit rate in the buffer memory 30, the quantity of the data occupying the buffer memory 30 may vary at each time. The filling level representing the volume of data stored in the buffer memory 30 is continuously monitored by a control block 40 and the monitored information is converted to a quantization parameter(QP), which is provided to a quantizer in the inter/intra mode compression block 10 as a control signal. The quantization parameter, which ranges from 1 to 31 is determined based on the amount of the data in the buffer memory 30. Therefore, according to the QP, the number of bits in the output of the inter/intra mode compression is controlled to ensure that the data in the buffer memory 30 neither overflows nor is emptied completely.

Referring back to the variable length coder 20, there are two sets of VLC tables: two first VLC tables 22 and 24, and a second VLC table 26. One of the first VLC table 22 is used for an inter mode compression; and the other of the first VLC table 24 and the second VLC table 26 are employed to carry out intra mode compression.

In the variable length coder 20, the compressed data from the inter/intra mode compression block 10 is applied to a switch SW1. And, the inter/intra mode selection signal from the inter/intra mode compression block 10 is provided to a first switch SW1 as a first switch control signal. In case of inter mode compression, the compressed data is provided to the first VLC table 22. And, in case of intra mode, the compressed data is supplied to the first VLC table 24 and the second VLC table 26. Since each compressed data inputted to the first VLC tables 22 and 24 and the second VLC table 26 serves as an address thereof, each of the output data therefrom becomes variable length code words.

In case of inter mode compression, the variable length code words from the first VLC table 22 are directly provided to the buffer memory 30. However, in case of intra mode, selection of one of the two VLC tables 24 and 26 is performed at a bit count and selection block 28, wherein the number of bits in each variable length code word from each of the two VLC tables 24 and 26 is counted and compared on a block-by-block basis, and then a control signal indicating a shorter variable length code word is provided to a second switch SW2. At the second switch SW2, in response to the control signal from the bit count and selection block 28, the selected variable length code word either from the first or the second VLC table 24, 26 is provided to the buffer memory 30.

In the above variable length coder using two VLC tables, however, since one of the two VLC tables 24 and 26 is selected in case of intra mode, additional or side information for notifying the selection of a given table must be transmitted to a receiver. Further, the processing time of VLC table selection in case of intra mode tends to hamper the variable length coder from operating at a high speed.

SUMMARY OF THE INVENTION

It is, therefore, an object of the invention to provide a variable length coder having two different VLC tables, which is capable of encoding a source digital code to a variable length code word without incurring a selection time loss and without having to use side information by employing a novel quantization parameter in accordance with the present invention.

In accordance with the invention, there is provided a variable length coder for converting a source digital code, which is provided from an image signal encoding apparatus using an inter mode or an intra mode compression, to a variable length code by using a first VLC table and a second VLC table, while indexing or quantifying the amount of output data from the encoding apparatus with a quantization parameter ranging from 1 to 31, comprising:

first VLC means for encoding the digital source code into the variable length code using the first table;

second VLC means for encoding the digital source code into the variable length code using the second table; and switching means for selectively providing the source digital code to said first or said second VLC means, depending on the inter or the intra mode compression employed and the magnitude of the quantization parameter, wherein, in case of the intra mode compression, if the quantization parameter is smaller than 16, the digital source code is provided to said first VLC means, and, if the quantinzation parameter is 16 or larger, the source code is provided to said second VLC means, in case of the inter mode compression, the source code is always provided to the first VLC means.

The above and other objects and features of the present invention will become apparent from the following description of preferred embodiments given in conjunction with the accompanying drawings, in which:

FIG. 1 is an image signal encoding apparatus having a common variable length coder employing two different VLC tables; and FIG. 2 describes a preferred embodiment of an image signal encoding apparatus having a variable length coder employing two different VLC tables in accordance with the present invention.

DETAILED DESCRIPTION OF THE PREFERRED EMBODIMENTS

Figure 1:
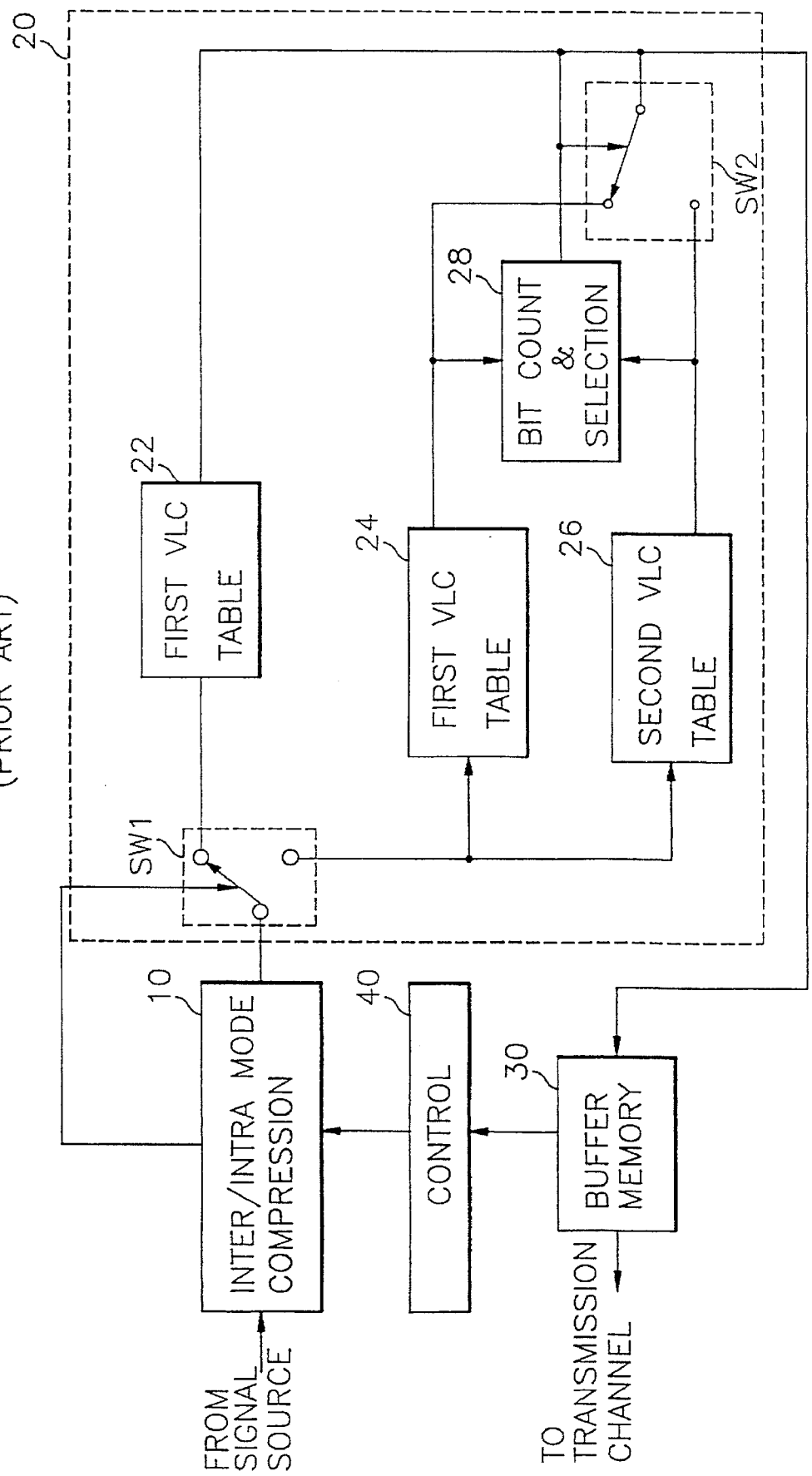

In Table 1, there are shown simulation results performed at the apparatus depicted in FIG. 1. According to the simulation, in case of intra mode compression, the frequency of selecting the first or the second VLC table is largely related to the quantization parameter(QP) as shown in the table.

TABLE 1

| Selection of VLC tables in case of intra mode compression of two images | | | |
|---|---|---|---|
| | | fruit | model |
| QP < 16 | first VLC table | 8,069,349 | 9,905,614 |
| | second VLC table | 2,158,448 | 2,585,994 |
| QP ≧ 16 | first VLC table | 881,723 | 1,192,607 |
| | second VLC table | 852,020 | 1,023,155 |

In the above table, the simulation is performed using the images of a fruit and a model: 1920×1035 pixels, MUSE standard image.

As is shown in the above table, it can be readily seen that, if QP is 16 or more, the selection frequency between the first and the second VLC tables is similar; however, in case QP is less than 16, the probability of selecting the second VLC table is decisively lower than that of the first VLC table. Therefore, the above simulation results can be beneficially used to improve the performance efficiency of the variable length coder shown in FIG. 1.

FIG. 2 describes a preferred embodiment of an improved image signal encoding apparatus having a variable length coder employing two VLC tables in accordance with the present invention. As shown in FIG. 2, an input video signal to the apparatus is provided from a signal source(not shown), for example, a video camera. The input signal is applied to an inter/intra mode compression block 100. In the inter/intra compression block 100, the input signal is compressed through an inter or an intra mode compression in accordance with a block-by-block process. The block size of the input signal typically ranges between 8×8 and 32×32 pixels.

The compressed data of each block and an inter/intra mode selection signal indicating whether said each block is compressed in the inter or the intra mode are provided to a variable length coder 200 wherein the compressed data, for example, run level codes, are converted into variable length code words. Thereafter, the variable length code words from the variable length coder 200 are provided to a buffer memory 300 for the transmission thereof to a receiver(not shown) via a transmission channel(not shown).

Since the output data from the variable length coder 200 is written at an irregular bit rate in the buffer memory 300, the quantity of the data occupying the buffer memory 300 may vary at times. The filling level representing the amount of data stored in the buffer memory 300 is continuously monitored by a QP(quantization parameter) control block 400, and the monitored information is converted to a quantization parameter and provided to a quantizer in the inter/intra mode compression block 100 and a switch control block 280 within the variable length coder 20.

Referring back to the variable length coder 200, there are provided two different VLC tables. A first VLC table 220 is the table that is used for an inter and an intra mode compression in the MPEG standard. And a second VLC table 260 is the table used only for an intra mode compression in the MPEG standard.

In the variable length coder 200, the compressed data from the inter/intra mode compression block 100 is sent to a first switch SW10. And, the inter/intra mode selection signal from the inter/intra mode compression block 100 is also provided to a first switch SW10 as the first switch SW10 control signal. In case of inter mode compression, the compressed data is provided to the first VLC table 220. And, in case of intra mode compression, the compressed data is supplied to a second switch SW20 controlled by a control block 280.

In the control block 280, a control signal is provided according to a quantization parameter from the control block 400. In case of QP<16, the compressed data from the first switch SW10 is provided to the first VLC table 220, and in case of QP>16 the compressed data from the first SW10 is supplied to the second VLC table 260.

Since each of the compressed data inputted to the first 220 and the second VLC table 260 serves as an address thereof, each of the output data from the two tables 220 and 260 becomes a variable length code word.

As may be seen from the above, in accordance with the present invention, since one VLC table is selected on the basis of the magnitude of the quantization parameter and inter/intra mode information, the table selection is immediately determined; and transmission of extra information for the table selection is not required.

While the present invention has been shown and described with reference to the particular embodiments, it will be apparent to those skilled in the art that many changes and modifications may be made without departing from the spirit and scope of the invention as defined in the appended claims.

What is claimed is:

1. A variable length coder for converting a source digital code, which is provided from an image signal encoding apparatus using an inter mode or an intra mode compression, to a variable length code by using a first variable length coding(VLC) table and a second VLC table, while indexing the amount of output data from the encoding apparatus with a quantization parameter, comprising:

first VLC means for encoding the digital source code into the variable length code using the first VLC table;

second VLC means for encoding the digital source code into the variable length code using the second VLC table;

first signal generation means for generating inter and intra mode selection signals;

second signal generation means for generating a quantization parameter;

first switching means, in response to the inter mode selection signal, for providing the source digital code to said first VLC means;

second switching means, in response to the intra mode selection signal, for selectively providing the source digital code to either said first or said second VLC means, depending on the magnitude of the quantization parameter.

2. The variable length coder of claim 1, wherein said quantization parameter ranges from 1 to 31; and if the quantization parameter is smaller than 16, the second switching means provides the source digital code to said first VLC means, and if the quantization parameter is equal to 16 or larger than 16, the second switching means provides the source digital code to said second VLC means.

* * * * *